US009958124B2

(12) United States Patent
Izawa

(10) Patent No.: US 9,958,124 B2
(45) Date of Patent: May 1, 2018

(54) VEHICULAR LAMP

(71) Applicant: Koito Manufacturing Co., Ltd., Tokyo (JP)

(72) Inventor: Masaki Izawa, Shizuoka (JP)

(73) Assignee: KOITO MANUFACTURING CO., LTD., Tokyo (JP)

(*) Notice: Subject to any disclaimer, the term of this patent is extended or adjusted under 35 U.S.C. 154(b) by 37 days.

(21) Appl. No.: 15/063,638

(22) Filed: Mar. 8, 2016

(65) Prior Publication Data

US 2016/0273728 A1    Sep. 22, 2016

(30) Foreign Application Priority Data

Mar. 20, 2015  (JP) .................................. 2015-058180

(51) Int. Cl.
*F21S 8/10* (2006.01)
*B60C 1/00* (2006.01)
*F21V 8/00* (2006.01)

(52) U.S. Cl.
CPC ........ *F21S 48/1233* (2013.01); *B60C 1/0041* (2013.01); *F21S 48/215* (2013.01); *F21S 48/2212* (2013.01); *F21S 48/2237* (2013.01); *F21S 48/2262* (2013.01); *F21S 48/2268* (2013.01); *F21S 48/2287* (2013.01); *G02B 6/0045* (2013.01)

(58) Field of Classification Search
CPC ............... F21S 48/1233; F21S 48/1241; F21S 48/1266; F21S 48/1291; F21S 48/2212; F21S 48/2225; F21S 48/2231; F21S 48/2237; F21S 48/2243; F21S 48/225; F21S 48/2256; F21S 48/2262; F21S 48/2268; F21S 48/2287; F21S 48/215; G02B 6/0045; G02B 6/0036; G02B 6/0038

See application file for complete search history.

(56) References Cited

U.S. PATENT DOCUMENTS 6,652,129 B2 * 11/2003 Aoki .................... B60Q 1/0041
                                                       362/551
2006/0146555 A1 *  7/2006 Inaba ................... B60Q 1/2665
                                                       362/494

(Continued)

FOREIGN PATENT DOCUMENTS

JP          2011-216279 A    10/2011

*Primary Examiner* — Y M Lee
(74) *Attorney, Agent, or Firm* — Abelman, Frayne & Schwab

(57) ABSTRACT

Disclosed is a vehicular lamp. The vehicular lamp includes an LED, a light guide guiding light emitted from the LED, and a light transmissive cover disposed in front of the light guide. The light guide includes a first end surface, a second end surface, a rear side surface with a plurality of steps, and a front side surface. A notched portion is formed on the front side surface. A notched surface is formed in the notched portion to cross the extension direction of the light guide. The steps reflect first light toward the front side surface and second light toward the notched surface. The light transmissive cover includes first and second emission portions causing the first and second lights to pass therethrough, respectively. An angle formed by the notched surface and the incidence surface of the second emission portion is within a range of 0 to 45 degrees.

8 Claims, 3 Drawing Sheets

(56) References Cited

U.S. PATENT DOCUMENTS

| | | | | |
|---|---|---|---|---|
| 2006/0193144 A1* | 8/2006 | Braeutigam | ......... | B60Q 1/2665 |
| | | | | 362/493 |
| 2009/0154186 A1* | 6/2009 | Natsume | .............. | B60Q 1/0041 |
| | | | | 362/516 |
| 2011/0058382 A1* | 3/2011 | Lin | ..................... | F21S 48/2237 |
| | | | | 362/518 |
| 2014/0036522 A1* | 2/2014 | Nakada | ................... | F21S 48/00 |
| | | | | 362/511 |

* cited by examiner

VEHICULAR LAMP

CROSS-REFERENCE TO RELATED APPLICATIONS

This application is based on and claims priority from Japanese Patent Application No. 2015-058180, filed on Mar. 20, 2015, with the Japan Patent Office, the disclosure of which is incorporated herein in its entirety by reference.

TECHNICAL FIELD

The present disclosure relates to a vehicular lamp.

BACKGROUND

A vehicular lamp has been known which includes a light guide that is disposed to extend in a left-and-right direction and a front-and-rear direction (Japanese Patent Laid-Open Publication No. 2011-216279). In such a light guide, a plurality of steps are formed on the rear side surface of the light guide along the extension direction of the light guide. Hence, light traveling through the light guide is reflected by the plurality of steps, and the reflected light is emitted toward the front side of the vehicular lamp through a front cover. By providing the steps on the rear side surface of the light guide, the entire light guide may be made to uniformly glow.

SUMMARY

A vehicular lamp of an aspect of the present disclosure includes a light source, a light guide configured to guide light emitted from the light source, and a light transmissive cover disposed in front of the light guide and configured to cause the light emitted from the light guide to pass therethrough. The light guide includes a first end surface which is provided at one end of the light guide and on which the light from the light source is incident, a second end surface which is provided at the other end of the light guide, a rear side surface which extends from the first end surface to the second end surface and on which a plurality of steps are formed, and a front side surface which extends from the first end surface to the second end surface. A notched portion is formed on the front side surface. A notched surface is formed in the notched portion to cross with an extension direction of the light guide. The plurality of steps are configured to reflect first light among light traveling through the light guide toward the front side surface and to reflect second light among the light traveling through the light guide toward the notched surface. The light transmissive cover includes a first emission portion which causes the first light emitted from the front side surface to pass therethrough, and a second emission portion which causes the second light emitted from the notched surface to pass therethrough. An angle formed by the notched surface and an incidence surface of the second emission portion on which the second light is incident is within a range of 0 to 45 degrees.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
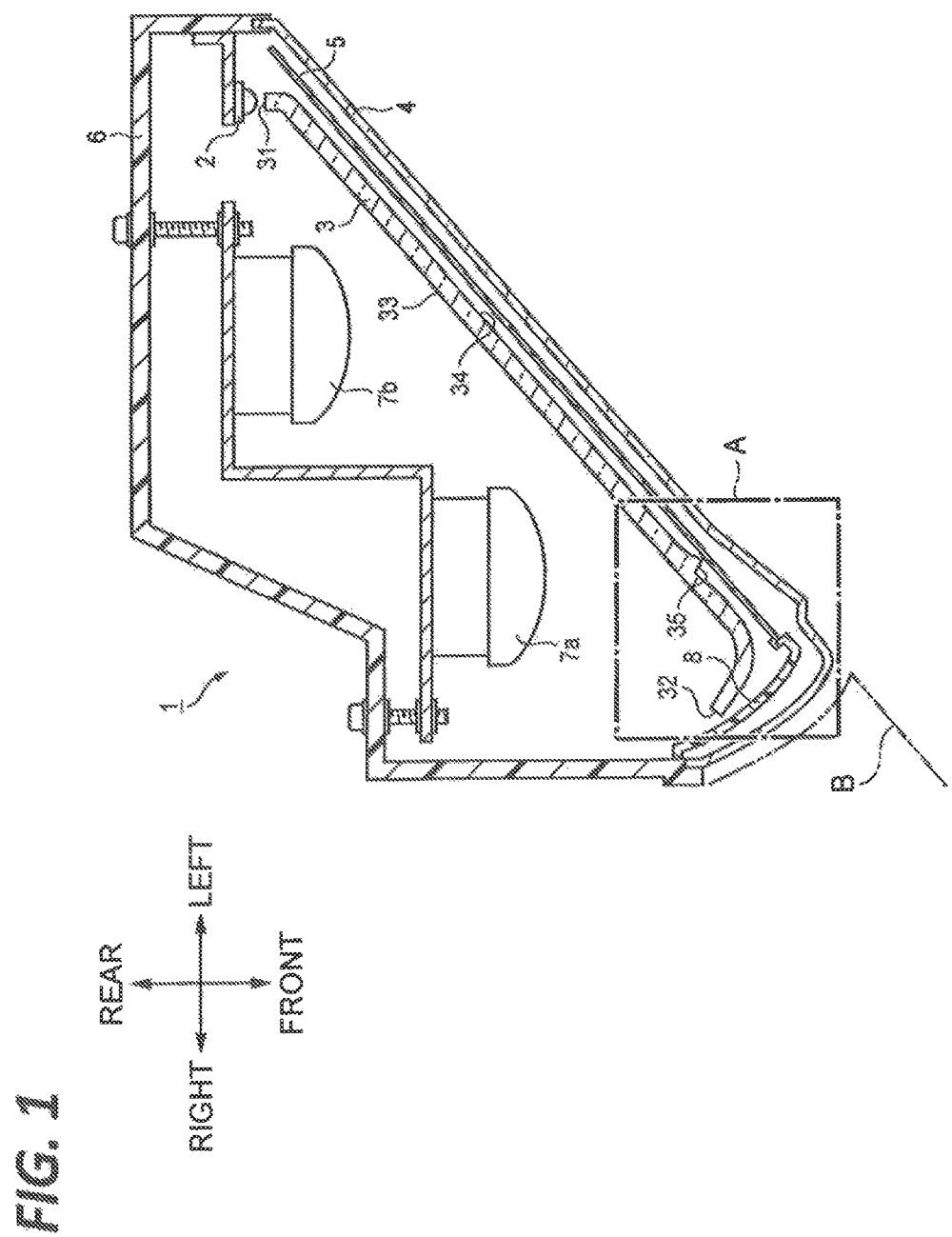
FIG. 1 is a horizontal cross-sectional view illustrating a vehicular lamp according to an exemplary embodiment of the present disclosure.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

In the light guide described in Japanese Patent Laid-Open Publication No. 2011-216279, however, there is a large difference in an irradiation dose of light depending on an irradiation direction of the light. For example, considering a case where the vehicular lamp is visually recognized from the front side thereof, when the light guide is visually recognized at a position that faces the front side surface of the light guide in the front-and-rear direction, the brightness of the light guide is high since the irradiation dose of the light reflected from the steps is large. Meanwhile, when the light guide is visually recognized at a position that faces the vicinity of the extension direction of the light guide, the brightness of the light guide becomes low since the irradiation dose of the light reflected from the steps is small. Accordingly, the brightness of the light guide varies depending on a direction in which the vehicular lamp is visually recognized (visual recognition angle).

The object of the present disclosure is to provide a vehicular lamp that is capable of increasing the irradiation dose of light emitted from an extension direction of a light guide or a nearby direction of the extension direction.

A vehicular lamp of an aspect of the present disclosure includes a light source, a light guide configured to guide light emitted from the light source, and a light transmissive cover disposed in front of the light guide and configured to cause the light emitted from the light guide to pass therethrough. The light guide includes a first end surface which is provided at one end of the light guide and on which the light from the light source is incident, a second end surface which is provided at the other end of the light guide, a rear side surface which extends from the first end surface to the second end surface and on which a plurality of steps are formed, and a front side surface which extends from the first end surface to the second end surface. A notched portion is formed on the front side surface. A notched surface is formed in the notched portion to cross with an extension direction of the light guide. The plurality of steps are configured to reflect first light among light traveling through the light guide toward the front side surface and to reflect second light among the light traveling through the light guide toward the notched surface. The light transmissive cover includes a first emission portion which causes the first light emitted from the front side surface to pass therethrough, and a second emission portion which causes the second light emitted from the notched surface to pass therethrough. An angle formed by the notched surface and an incidence surface of the second emission portion on which the second light is incident is within a range of 0 to 45 degrees.

According to this configuration, the notched portion is formed on the front side surface of the light guide, and the angle formed by the notched surface of the notched portion and the incidence surface of the second emission portion is within a range of 0 to 45 degrees. Hence, it is possible to provide a vehicular lamp that is capable of increasing the irradiation dose of the light emitted from the extension direction of the light guide or the nearby direction of the extension direction.

Further, the second emission portion may include a light diffusion portion configured to diffuse the light incident on the second emission portion.

According to this configuration, by diffusing the light incident on the second emission portion by the light diffusion portion, light may be emitted from the second emission portion over a wider range.

The vehicular lamp may further include an inner lens disposed between the light guide and the light transmissive cover in the front-and-rear direction of the vehicular lamp and configured to cause the light emitted from the light guide to pass therethrough.

According to this configuration, by disposing the inner lens between the notched surface of the notched portion and the incidence surface of the second emission portion, a relative position between the notched surface and the incidence surface may be properly adjusted thereby increasing a degree of freedom in designing the vehicular lamp.

The vehicular lamp may further include a light shielding member disposed between the light guide and the light transmissive cover in the front-and-rear direction of the vehicular lamp to cover the second end surface of the light guide.

According to this configuration, by disposing the light shielding member between the light guide and the light transmissive cover in the front-and-rear direction to cover the second end surface of the light guide, the second end surface apparently glowing in high brightness may be made not to be visually recognized from a front direction.

Further, the light guide may be bent between the notched surface and the second end surface to make the second end surface directed toward a rear side.

According to this configuration, by bending the light guide between the notched surface and the second end surface to make the second end surface directed toward a rear side, the second end surface may be made not to appear to glow in high brightness.

A vehicular lamp of another aspect of the present disclosure includes a light source, a light guide configured to guide light emitted from the light source, and a light transmissive cover disposed in front of the light guide and configured to cause the light emitted from the light guide to pass therethrough. The light guide includes a first end surface which is provided at one end of the light guide and on which the light from the light source is incident, a second end surface which is provided at the other end of the light guide, a rear side surface which extends from the first end surface to the second end surface and on which a plurality of steps are formed, and a front side surface which extends from the first end surface to the second end surface. A notched portion is formed on the front side surface. A notched surface is formed in the notched portion to cross with an extension direction of the light guide. The plurality of steps are configured to reflect first light among light traveling through the light guide toward the front side surface and to reflect second light among the light traveling through the light guide toward the notched surface. The light transmissive cover includes a first emission portion which causes the first light emitted from the front side surface to pass therethrough, a second emission portion which causes the second light emitted from the notched surface to pass therethrough, and a bent portion which is formed between the first emission portion and the second emission portion.

By forming the bent portion in the light transmissive cover, the angle formed by the second emission portion and the notched surface may be properly adjusted. Accordingly, it is possible to provide a vehicular lamp that is capable of increasing the irradiation dose of the light emitted from the extension direction of the light guide or the nearby direction of the extension direction.

According to the present disclosure, it is possible to provide a vehicular lamp that is capable of increasing the irradiation dose of the light emitted from the extension direction of the light guide or the nearby direction of the extension direction.

Hereinafter, exemplary embodiments of the present disclosure will be described with reference to the drawings. In the descriptions of the exemplary embodiments, for the convenience of the explanation, descriptions of members that have the same reference numerals as those of already described members will be omitted. Further, for the convenience of the explanation, the dimension of each of the members illustrated in the drawings may be different from the actual dimension of each of the members.

Further, in the descriptions of the exemplary embodiments, for the convenience of the explanation, a left direction, a right direction, a front direction, a rear direction, a left-and-right direction, and a front-and-rear direction will be properly mentioned. These directions are relative directions that are set with respect to the vehicular lamp 1 illustrated in FIG. 1. Thus, it is noted that when the vehicular lamp 1 illustrated in FIG. 1 turns in a predetermined direction, the above-mentioned directions also turn. Further, the left direction and the right direction in the drawings correspond to the left direction and the right direction, respectively, when the vehicular lamp 1 is visually recognized from the rear side thereof.

FIG. 1 is a horizontal cross-sectional view illustrating the vehicular lamp 1 according to an exemplary embodiment of the present disclosure when viewed from the top side thereof. As illustrated in FIG. 1, the vehicular lamp 1 includes a lamp body 6, a light transmissive cover 4, lamp units 7a and 7b, an LED 2 (light source), a light guide 3, an inner lens 5, and a light shielding member 8. In the present exemplary embodiment, the vehicular lamp 1 is used as a head lamp. FIG. 1 illustrates a left head lamp. Although a right head lamp is not illustrated in FIG. 1, the structure of the right head lamp is bilaterally symmetrical and almost identical to the structure of the left side head lamp.

The lamp units 7a and 7b, the light guide 3, the inner lens 5, and the light shielding member 8 are arranged within a lamp chamber S formed by the lamp body 6 and the light transmissive cover 4. The lamp units 7a and 7b are a low beam lamp and a high beam lamp, respectively. Although FIG. 1 exemplifies the two lamp units, the number of the lamp units may be properly changed depending on a vehicle type. Further, the light guide 3 is a clearance lamp and/or a daytime running lamp.

The LED 2 is configured to emit, for example, white light. In the present exemplary embodiment, the LED 2 is exemplified as a light source of the light that is incident on the light guide 3. However, a light source (e.g., a semiconductor laser) other than the LED may be employed.

Figure 2:
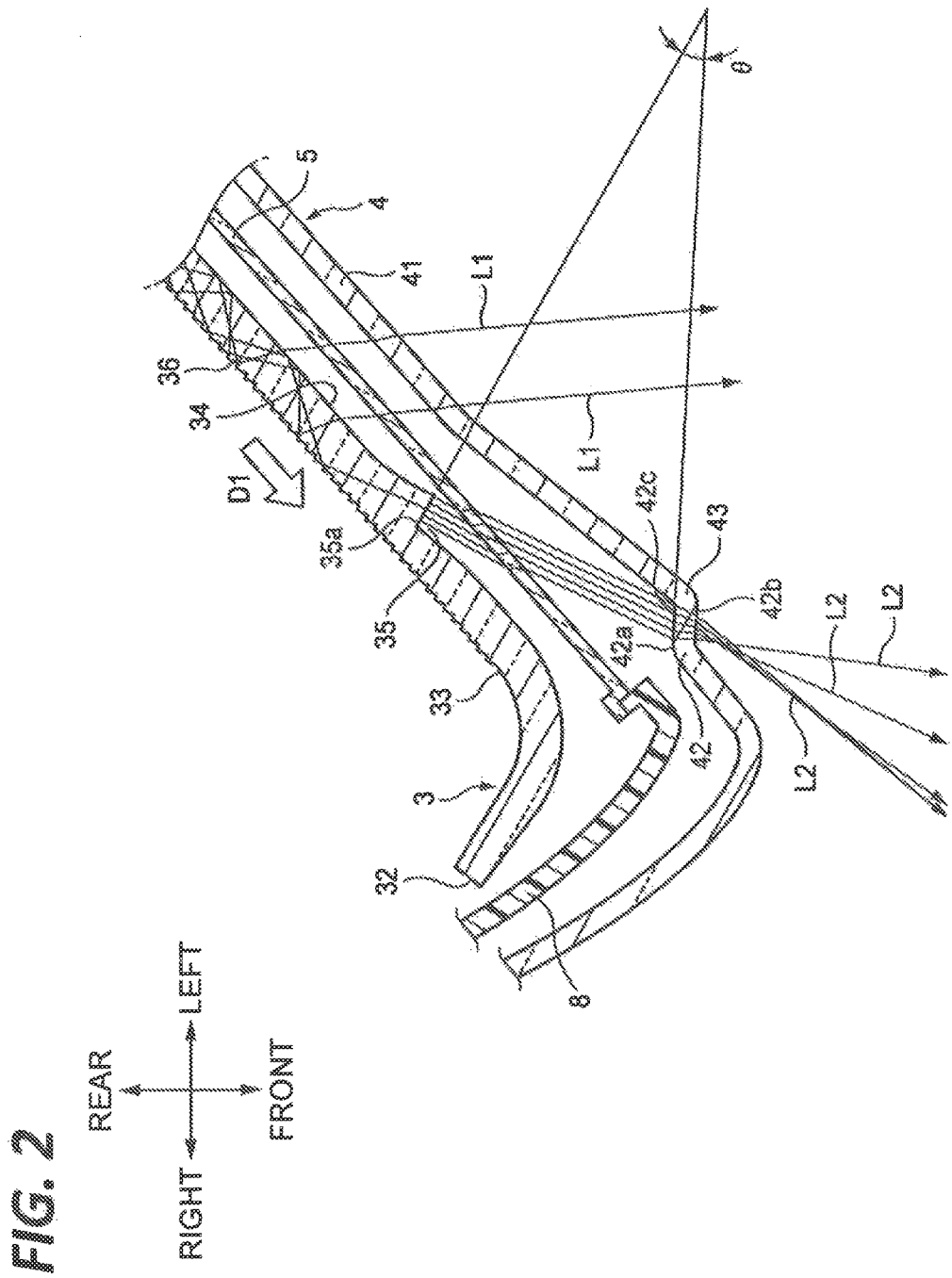
FIG. 2 is a horizontal cross-sectional view illustrating the vicinity of an area A of the vehicular lamp illustrated in FIG. 1.

Next, descriptions will be made on the configuration of the light guide 3, the light transmissive cover 4, and the inner lens 5 with reference to FIGS. 1 and 2. FIG. 2 is a horizontal cross-sectional view illustrating the vicinity of the area A of the vehicular lamp 1 illustrated in FIG. 1. The light guide 3 is disposed to extend in the left-and-right direction and the front-and-rear direction within the lamp chamber S and configured to guide the light emitted from the LED 2. The light guide 3 is formed of, for example, a transparent resin and includes a first end surface 31, a second end surface 32, a rear side surface 33, and a front side surface 34 (see FIG. 1). In the present exemplary embodiment, the light guide 3 is formed in a rod shape. However, the shape of the light guide 3 may be properly changed depending on a use thereof and may be formed in, for example, a plate shape.

As illustrated in FIG. 1, the first end surface 31 is provided at one end of the light guide 3 and disposed to face the LED 2 so as to make the light emitted from the LED 2 incident on the first end surface 31. The second end surface 32 is provided at the other end of the light guide 3. The rear side surface 33 extends from the first end surface 31 to the second end surface 32. A plurality of steps 36 are formed on the rear side surface 33. The steps 36 are configured to reflect the light emitted from the LED 2 and traveling through the light guide 3 via the first end surface 31 toward the front side of the vehicular lamp 1. Although the shape of each of the steps 36 is not specifically limited, the steps 36 are formed in, for example, a substantially triangular prismatic shape.

Figure 3:
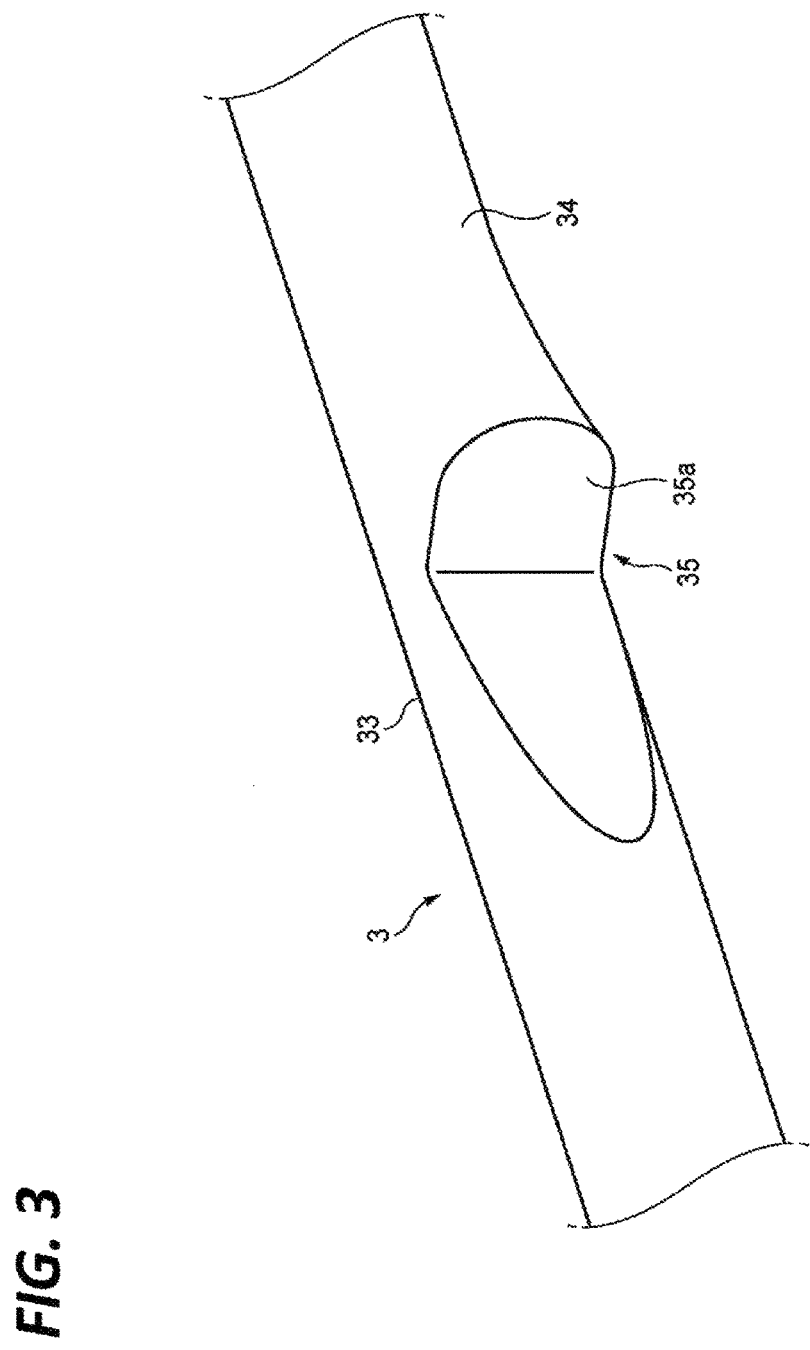
FIG. 3 is a perspective view illustrating the periphery of a notched portion of the light guide.

The front side surface 34 is disposed at the opposite side of the rear side surface 33 and extends from the first end surface 31 to the second end surface 32. A notched portion 35 is formed on the front side surface 34. A notched surface 35a is formed in the notched portion 35 to cross the extension direction D1 of the light guide 3. In FIG. 2, the notched surface 35a crosses the extension direction D1 at about 70 degrees. However, the crossing angle between the notched surface 35a and the extension direction D1 is not specifically limited. The three-dimensional shape of the notched portion 35 is illustrated in FIG. 3.

As illustrated in FIG. 2, the steps 36 are configured to reflect a part of the light traveling through the light guide 3 toward the front side surface 34 and another part of the same light toward the notched surface 35a. In the descriptions hereinafter, the light reflected by the steps 36 toward the front side surface 34 will be referred to as the "first light L1," and the light reflected by the steps 36 toward the notched surface 35a will be referred to as the "second light L2." For the convenience of the explanation, FIG. 1 represents light beams of only a part of the first and second lights L1 and L2. Especially, FIG. 2 represents only the light beams of the second light L2 emitted substantially vertically from the notched surface 35. This is because, among the light beams of the second light L2 emitted from the notched surface 35a, the light beams emitted substantially vertically from the notched surface 35a have the largest irradiation dose, and the behavior of the light beams having the largest irradiation dose is analyzed. Further, it is assumed that the number of the light beams of the second light L2 traveling through the light guide 3 is one (1), from the viewpoint of facilitating the viewing of the drawings.

As illustrated in FIG. 2, the light guide 3 is bent between the notched surface 35a and the second end surface 32 to make the second end surface 32 of the light guide 3 directed toward the rear side. By bending the light guide 3 in this way, the second end surface 32 may be made not to appear to glow in high brightness when the vehicular lamp 1 is visually recognized from the front side thereof.

The light transmissive cover 4 is disposed in front of the light guide 3 and configured to cause the light emitted from the light guide 3 to pass therethrough. The light transmissive cover 4 is formed of, for example, a transparent resin such as an acrylic resin or a polycarbonate resin, and has a refractive index of, for example, n=1.5 to 1.6. The light transmissive cover 4 includes a first emission portion 41, a second emission portion 42, and a bent portion formed between the first emission portion 41 and the second emission portion 42. The first emission portion 41 extends along the light guide 3 and is configured to cause the first light L1 emitted from the front side surface 34 of the light guide 3 to pass therethrough.

The second emission portion 42 is configured to cause the second light L2 emitted from the notched surface 35a of the light guide 3 to pass therethrough. The second emission portion 42 includes an incidence surface 42a on which the second light L2 is incident and an emission surface 42b from which the second light L2 is emitted. As illustrated in FIG. 2, the positional relationship between the notched surface 35a and the incidence surface 42a of the second emission portion 42 is set so as to make the angle formed by the notched surface 35a and the incidence surface 42a fall within a range of 0 to 45 degrees. In addition, a light diffusion portion 42c is formed on the incidence surface 42a of the second emission portion 42 to diffuse the light incident on the second emission portion 42. The light diffusion portion 42c may be formed by an emboss processing or may be formed as cylindrical steps or fish-eye steps. By diffusing the light incident on the second emission portion 42 by the light diffusion portion 42c, light may be emitted from the second emission portion 42 over a wider range.

The inner lens 5 is disposed between the light guide 5 and the light transmissive cover 4 in the front-and-rear direction to extend along the light guide 3. The inner lens 5 is configured to cause the first light L1 and the second light L2 that are emitted from the light guide 3 to pass therethrough. The inner lens 5 is formed of, for example, a transparent resin.

The light shielding member 8 is disposed between the light guide 5 and the light transmissive cover 4 in the front-and-rear direction to cover the second end surface 32 of the light guide 3. The light shielding member 8 is formed of, for example, a resin material and has a metal-deposited surface. By the light shielding member 8, the second end surface 32 that apparently glows with high brightness may be made not to be visually recognized from the front side.

Hereinafter, descriptions will be made on effects of the vehicular lamp 1 according to the present exemplary embodiment.

When observing the first light L1 that is reflected by the steps 36 of the light guide 3 and passes through the first emission portion 41 of the light transmissive cover 4, the irradiation dose of the first light L1 emitted from the extension direction D1 of the light guide 3 or the nearby direction of the extension direction is small.

Thus, in the vehicular lamp 1 according to the present exemplary embodiment, the notched portion 35 is provided on the front side surface 34 of the light guide 3, and the angle θ formed by the notched surface 35a of the notched portion 35 and the incidence surface 42a of the second emission portion 42 is set to fall within a range of 0 to 45 degrees. Hence, the second light L2 that is reflected by the steps 36 and passes through the second emission portion 42 of the light transmissive cover 4 via the notched surface 35 is emitted toward the extension direction D1 of the light guide 3 or the nearby direction of the extension direction. Accordingly, in the present exemplary embodiment, it is possible to provide the vehicular lamp 1 that is capable of increasing the irradiation dose of the light emitted from the extension direction D1 of the light guide 3 or the nearby direction of the extension direction. Therefore, the visibility of the light guide 3 in the extension direction D1 of the light guide 3 or the nearby direction of the extension direction is improved. For example, as illustrated in FIG. 1, when the vehicular lamp 1 is mounted as a head lamp in the vehicle, the irradiation dose of the light emitted from the light guide 3 becomes large in the direction along the outline B of the bumper so that the visibility of the light guide 3 in the same direction is improved.

Further, when the notched surface 35a and the incidence surface 42a are substantially in parallel with each other (the angle θ formed by both the surfaces is zero (0)), the second light L2 emitted substantially vertically from the notched surface 35a is substantially vertically incident on the incidence surface 42a. In this case, a reflection loss that is caused by a refractive index difference between the air (refractive index n=1) and the light transmissive cover 4 (for example, refractive index n=1.5 to 1.6) is the smallest.

The influence of the reflection loss caused by the refractive index difference between the air and the light transmissive cover 4 is small when the incident angle of the second light L2 to the incidence surface 42a is within a range of 45 to 90 degrees. When the reflection loss is small, the irradiation dose of the second light L2 emitted from the second emission portion 42 may increase. Accordingly, the angle θ formed by the notched surface 35a and the incidence surface 42a is preferably within the range of 0 to 45 degrees so as to make the incident angle of the second light L2 to the incidence surface 42a fall within the range of 45 to 90 degrees.

When describing the present exemplary embodiment from a different viewpoint, the bent portion 43 is formed in the light transmissive cover 4 by making the first emission portion 41 and the second emission portion 42 cross each other at a predetermined angle. When the bent portion 43 is formed in the light transmissive cover 4, the angle θ formed by the second emission portion 42 and the notched surface 35a may be properly adjusted. In this way, the irradiation dose of the light emitted from the extension direction D1 of the light guide 3 or the nearby direction of the extension direction may increase so that the visibility of the light guide 3 in the extension direction D1 of the light guide 3 or the nearby direction of the extension direction is improved.

Further, as illustrated in FIG. 2, by disposing the inner lens 5 between the notched surface 35a of the notched portion 35 and the incidence surface 42a of the second emission portion 42, the relative position between the notched surface 35a and the incidence surface 42 may be properly adjusted thereby increasing the degree of freedom in designing the vehicular lamp 1. Of course, the inner lens 5 is not an essential element of the vehicular lamp 1.

Although the vehicular lamp 1 according to the present exemplary embodiment is used as, for example, a head lamp, the vehicular lamp 1 is not limited to the head lamp and may be applied to, for example, a tail lamp, a stop lamp, and a turn signal lamp as long as the lamps are to increase the irradiation dose of the light in the extension direction of the light guide or the nearby direction of the extension direction.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:
1. A vehicular lamp comprising:
a light source;
a light guide configured to guide light emitted from the light source; and
a light transmissive cover disposed in front of the light guide and configured to cause the light emitted from the light guide to pass therethrough,
wherein the light guide includes:
a first end surface provided at one end of the light guide, the light from the light source being incident on the first end surface,
a second end surface provided at another end of the light guide,
a rear side surface extending from the first end surface to the second end surface and having a plurality of steps formed thereon, and
a front side surface disposed at an opposite side of the rear side surface and extending from the first end surface to the second end surface,
wherein a notched portion is formed on the front side surface,
wherein a notched surface is formed in the notched portion to cross with an extension direction of the light guide,
wherein the plurality of steps are configured to reflect first light among light traveling through the light guide toward the front side surface and to reflect second light among the light traveling through the light guide toward the notched surface,
wherein the light transmissive cover includes:
a first emission portion configured to cause the first light emitted from the front side surface to pass therethrough, and
a second emission portion configured to cause the second light emitted from the notched surface to pass, and
wherein an angle formed by the notched surface and an incidence surface of the second emission portion on which the second light is incident is set within a range of 0 to 45 degrees such that the second emission portion emits the second light toward the extension direction of the light guide.

2. The vehicular lamp of claim 1, wherein the second emission portion includes a light diffusion portion configured to diffuse the light incident on the second emission portion.

3. The vehicular lamp of claim 2, wherein the light diffusion portion is formed as cylindrical steps or fish-eye steps.

4. The vehicular lamp of claim 1, further comprising:
an inner lens disposed between the light guide and the light transmissive cover in a front-and-rear direction of the vehicular lamp, the inner lens being configured to cause the light emitted from the light guide to pass therethrough.

5. The vehicular lamp of claim 1, further comprising:

a light shielding member disposed between the light guide and the light transmissive cover in a front-and-rear direction of the vehicular lamp to cover the second end surface of the light guide.

6. The vehicular lamp of claim 1, wherein the light guide is bent between the notched surface and the second end surface to make the second end surface directed toward a rear side.

7. The vehicular lamp of claim 1, wherein the notched surface crosses the extension direction of the light guide at about 70 degrees.

8. A vehicular lamp comprising:
   a light source;
   a light guide configured to guide light emitted from the light source; and
   a light transmissive cover disposed in front of the light guide and configured to cause the light emitted from the light guide to pass therethrough,
   wherein the light guide includes
      a first end surface provided at one end of the light guide, the light from the light source being incident on the first end surface,
      a second end surface provided at another end of the light guide,
      a rear side surface extending from the first end surface to the second end surface and having a plurality of steps formed thereon, and
      a front side surface disposed at an opposite side of the rear side surface and extending from the first end surface to the second end surface,
   wherein a notched portion is formed on the front side surface,
   wherein a notched surface is formed in the notched portion to cross an extension direction of the light guide,
   wherein the plurality of steps are configured to reflect first light among light traveling in the light guide toward the front side surface and to reflect second light among the light traveling in the light guide toward the notched surface, and
   wherein the light transmissive cover includes:
      a first emission portion configured to cause the first light emitted from the front side surface to pass therethrough,
      a second emission portion configured to cause the second light emitted from the notched surface to pass therethrough and to emit the second light toward the extension direction of the light guide, and
      a bent portion formed between the first emission portion and the second emission portion.

* * * * *